United States Patent
Li et al.

(10) Patent No.: US 12,470,775 B2
(45) Date of Patent: Nov. 11, 2025

(54) METHOD AND APPARATUS FOR VIDEO PROCESSING

(71) Applicant: LEMON INC., Grand Cayman (KY)

(72) Inventors: Yujie Li, Beijing (CN); Ruie Gao, Beijing (CN); Pingfangzi Ai, Beijing (CN); Weiwei Qi, Beijing (CN); Siqi Tan, Beijing (CN); Tiancheng Yang, Culver City, CA (US); Ryan Rosello, Culver City, CA (US)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 17/538,917

(22) Filed: Nov. 30, 2021

(65) Prior Publication Data

US 2022/0385985 A1 Dec. 1, 2022

(30) Foreign Application Priority Data

Jun. 1, 2021 (CN) .......................... 202110610198.5

(51) Int. Cl.
*H04N 21/422* (2011.01)
*H04N 21/472* (2011.01)
(Continued)

(52) U.S. Cl.
CPC ..... *H04N 21/4882* (2013.01); *H04N 21/4221* (2013.01); *H04N 21/47217* (2013.01);
(Continued)

(58) Field of Classification Search
CPC ........... H04N 21/4221; H04N 21/4856; H04N 21/4884; H04N 21/4888
See application file for complete search history.

(56) References Cited

U.S. PATENT DOCUMENTS 10,965,888 B1 3/2021 Boyd et al.
2008/0180572 A1* 7/2008 Pickett ............... H04N 21/4884
348/E7.001
(Continued)

FOREIGN PATENT DOCUMENTS

CN 102291542 A 12/2011
CN 104080003 A 10/2014
(Continued)

OTHER PUBLICATIONS

Search Report and Written Opinion issued in PCT/SG2022/050297, mailed Jul. 18, 2022.
(Continued)

*Primary Examiner* — Pinkal R Chokshi
(74) *Attorney, Agent, or Firm* — Faegre Drinker Biddle & Reath LLP

(57) ABSTRACT

The present disclosure provides a method and apparatus for video processing. The method displays a playback interface of a first video displaying subtitle widget used to display a subtitle of the first video; displays, in response to a first touch operation of a user on the subtitle widget during playback of the first video, a setting pop-up window, the setting pop-up window used by a user to set the language of subtitles for the first video and/or to set the subtitle widget to be hiding; processes the first video in response to a second touch operation of the user on the setting pop-up window.

20 Claims, 9 Drawing Sheets

(51) Int. Cl.
  *H04N 21/485* (2011.01)
  *H04N 21/488* (2011.01)
  *H04N 21/81* (2011.01)
(52) U.S. Cl.
  CPC ..... *H04N 21/4856* (2013.01); *H04N 21/4884* (2013.01); *H04N 21/4888* (2013.01); *H04N 21/8106* (2013.01)

(56) References Cited

U.S. PATENT DOCUMENTS

| | | | |
|---|---|---|---|
| 2008/0284910 A1* | 11/2008 | Erskine | H04N 5/9206 348/E7.001 |
| 2009/0178010 A1 | 7/2009 | Chaudhri | |
| 2010/0146445 A1* | 6/2010 | Kraut | G06F 3/162 700/94 |
| 2011/0164175 A1* | 7/2011 | Chung | H04N 21/42209 348/468 |
| 2013/0311575 A1* | 11/2013 | Woods | H04N 21/8456 709/206 |
| 2014/0033025 A1* | 1/2014 | Mukherjee | H04N 21/4884 715/246 |
| 2015/0363091 A1* | 12/2015 | Lee | G06F 3/04847 715/722 |
| 2015/0382064 A1* | 12/2015 | Aravamudan | H04N 21/4755 725/37 |
| 2016/0133154 A1* | 5/2016 | Cortes | G09B 5/00 434/157 |
| 2020/0252696 A1* | 8/2020 | Feng | H04N 21/436 |
| 2020/0359104 A1 | 11/2020 | Luo et al. | |
| 2021/0014575 A1* | 1/2021 | Selfors | G09B 19/06 |
| 2021/0105538 A1* | 4/2021 | Ogawa | H04N 21/44008 |
| 2021/0160582 A1* | 5/2021 | Gu | H04N 21/4884 |
| 2021/0185244 A1* | 6/2021 | Boyd | G06F 3/04847 |
| 2021/0373843 A1* | 12/2021 | Hornsby | H04N 5/278 |
| 2022/0132217 A1* | 4/2022 | Aher | H04N 21/4667 |

FOREIGN PATENT DOCUMENTS

| | | |
|---|---|---|
| CN | 104822078 A | 8/2015 |
| CN | 106911971 A | 6/2017 |
| CN | 108156480 A | 6/2018 |
| CN | 108600773 A | 9/2018 |
| CN | 111683266 A | 9/2020 |
| CN | 112055261 A | 12/2020 |
| CN | 112684967 A | 1/2021 |
| CN | 112702658 A | 4/2021 |
| EP | 3605357 A2 | 2/2020 |
| JP | 2021061519 A | 4/2021 |

OTHER PUBLICATIONS

How to implement language switching of subtitles and hide and display of subtitles when playing movie videos. Jun. 5, 2016 [Retrieved Jun. 1, 2022 from https://web.archive.org/web/20220601091839/https://www.docin.com/p-1622783082.html] 3 Display and switch subtitle operation instructions, step 3 and the corresponding figure.

Huang S., et al., "State Machine Based Video Rate Adaptation Algorithm," Journal of Computer Applications, Jul. 10, 2018, vol. 38, No. 7, 06 Pages, ISSN 1001-9081, (with English Abstract).

Notice of Refusal for Japanese Application No. 2023-574319, mailed Nov. 5, 2024, 10 pages.

Extended European Search Report mailed Aug. 23, 2024 for European Application No. 22816552.

Peter Molsted Dr (Danish Broadcasting) Dr Byen et al: Now the subtitles are read aloud; AVA-I-0148*, ITU-T Draft; Study Period 2009-2012, International Telecommunication Union, Geneva, CH, vol. ava, May 26, 2012 (May 26, 2012), pp. 1-2, XP044095592, [retrieved on May 26, 2012 *the whole document*].

* cited by examiner

METHOD AND APPARATUS FOR VIDEO PROCESSING

CROSS-REFERENCE TO RELATED APPLICATION

The present disclosure is based on and claims priority to China Patent Application No. 202110610198.5 filed on Jun. 1, 2021, the disclosure of which is incorporated by reference herein in its entirety.

TECHNOLOGY FIELD

The present disclosure relates to the field of terminals and, in particular, to a method and apparatus for video processing.

BACKGROUND ART

With the development of software development technology, there are more and more types of Application (APP) on mobile terminals. Among them, apps such as video type are very popular. Users can browse various types of videos released by their creators through video apps. However, it is not easy to adjust the subtitles while browsing the videos and the user experience is therefore not good.

SUMMARY

The present disclosure provides a method and apparatus for video processing that allows the user to adjust the playback interface, enhancing the user experience.

In the first aspect, the present disclosure provides a video processing method comprising displaying a playback interface of a first video, the playback interface of the first video displaying a subtitle widget, the subtitle widget used to display the subtitles of the first video; displaying a setting pop-up window, in response to a first touch operation by the user on the subtitle widget during playback of the first video, the setting pop-up window used for the user to set the subtitle language of the first video and/or to set the subtitle widget to be hiding; processing the first video in response to a second touch operation by the user on the setting pop-up window.

In certain embodiments, the setting pop-up window comprises a subtitle widget hiding option, the second touch operation comprising a touch operation by the user on the subtitle widget hiding option; processing the first video comprising hiding the subtitle widget and displaying a subtitle hover window on a playback interface of the first video such that the subtitles of the first video stay in a hiding status.

In certain embodiments, the method further comprises receiving a user-triggered video switch command; and displaying a second video and continuing to hide the subtitle widget on the playback interface of the second video and displaying the subtitle hover window.

In certain embodiments, continuing to hide the subtitle widget on the playback interface of the second video and displaying the subtitle hover window, comprises querying the value of a first parameter, the first parameter comprising parameter associated with status of the subtitle widget; and if the value of the first parameter is a first predetermined value, continuing to hide the subtitle widget and displaying the subtitle hover window on the playback interface of the second video.

In certain embodiments, the method further comprises resuming, in response to a third touch operation by the user on the subtitle hover window, displaying the subtitle widget on the playback interface of the first video, such that the subtitles of the first video stay in a display status.

In certain embodiments, the subtitles displayed by the subtitle widget are synchronized with the video frames in the first video currently playing after the subtitle widget resumes the display.

In certain embodiments, the method further comprises receiving a user-triggered video switch command; and displaying a second video and continuing to display the subtitle widget on the playback interface of the second video.

In certain embodiments, continuing to display the subtitle widget on the playback interface of the second video comprises querying a value of the first parameter, the first parameter comprising parameter associated with a status of the subtitle widget; and if the value of the first parameter is a second predetermined value, continuing to display the subtitle widget on the playback interface of the second video.

In certain embodiments, the setting pop-up window comprises a subtitle language setting option, the second touch operation comprising a touch operation by the user on the subtitle language setting option; processing the first video comprising updating the subtitles of the first video to the subtitle language triggered by the second touch operation.

In certain embodiments, the setting pop-up window comprises an audio switch option and the second touch operation comprises a touch operation by the user on the audio switch option; processing the first video comprising updating the audio of the first video to the audio corresponding to the audio switch option.

In certain embodiments, the method further comprises receiving a fourth touch operation from a user; displaying, in response to the fourth touch operation, an application settings interface, the application settings interface comprising an auto translation switch control and/or an auto reading switch control.

In certain embodiments, the application setting interface comprises an auto translation switch control, the method further comprises receiving a fifth touch operation by the user on the auto translation switch control; determining, based on the fifth touch operation, an on/off status of the auto translation function; determining, based on the on/off status of the auto translation function, a default subtitle type for the video.

In certain embodiments, determining the default subtitle type of the video according to the on/off status of the auto translation function, comprising if the auto translation function is on, determining that the default subtitles are translated subtitles; if the auto translation function is off, determining that the default subtitle is original subtitles.

In certain embodiments, the application setting interface comprises an auto reading switch control, the auto reading switch control stay in an active status when the auto translation function is on, the method further comprises receiving a sixth touch operation by the user on the auto reading switch control; determining, based on the sixth touch operation, the on/off status of the auto reading function; and determining, based on the on/off status of the auto reading function, a default audio for the video.

In certain embodiments, determining, based on the on/off status of the auto reading function, a default audio for the video comprises determining that the default audio is a reading audio if the auto reading function is on; and determining that the default audio is an original audio if the auto reading function is off.

In a second aspect, the present disclosure provides a terminal device comprising a display module for displaying a playback interface of a first video, the playback interface of the first video displaying a subtitle widget, the subtitle widget used to display subtitles for the first video; further for displaying a setting pop-up window in response to a first touch operation by the user on the subtitle widget during playback of the first video, the setting pop-up window used by a user to set the subtitle language of the first video and/or to set the subtitle widget to be hiding; and a processing module for processing the first video in response to a second touch operation by the user on the setting pop-up window.

In a third aspect, the present disclosure provides a computer readable storage medium having a computer program stored thereon, the computer program when executed by a processor implements the method provided by the first aspect.

In the fourth aspect, the present disclosure provides a terminal device comprising a processor; and a memory for storing executable instructions of the processor; wherein the processor is configured to implement the method provided by the first aspect by executing the executable instructions.

The method and apparatus for video processing, displays a playback interface of a first video, displays a setting pop-up window, in response to a first touch operation by the user on the subtitle widget during playback of the first video, and processes the first video in response to a second touch operation by the user on the setting pop-up window. The method as stated above allows users to hide subtitle components, change subtitle language and audio language, which greatly enhances the user experience.

DETAILED DESCRIPTION OF EMBODIMENTS

In order to allow the purpose, technical solutions and advantages of the present disclosure clearer, a clear and complete description of the technical solutions in the present disclosure will be given below in conjunction with the accompanying drawings in the present disclosure, and it is clear that the embodiments described are a part of the embodiments of the present disclosure, and not all of them. Based on the embodiments in the present disclosure, all other embodiments obtained by a person of ordinary skill in the art without creative labor fall within the scope of protection of the present disclosure.

In the present disclosure, it is to be explained that the terms "first" and "second" are used only for descriptive purposes only and are not to be understood as indicating or implying relative importance. In addition, "at least one" means one or more, and "more than one" means two or more. The word "and/or", describing the relationship of associated objects, indicates that three relationships can exist, for example, A and/or B, which can indicate: the presence of A alone, the presence of both A and B, and the presence of B alone, where A and B can be singular or plural. The character "to" generally indicates an "or" relationship between the associated objects. The expression "at least one (of the following)", or its equivalent, refers to any combination of these terms, including any combination of single (one) or plural (one) terms. For example, at least one (one) of a, b, or c, may denote: a alone, b alone, c alone, a and b combined, a and c combined, b and c combined, or a, b, and c combined, where a, b, and c may be single or multiple.

Figure 1:
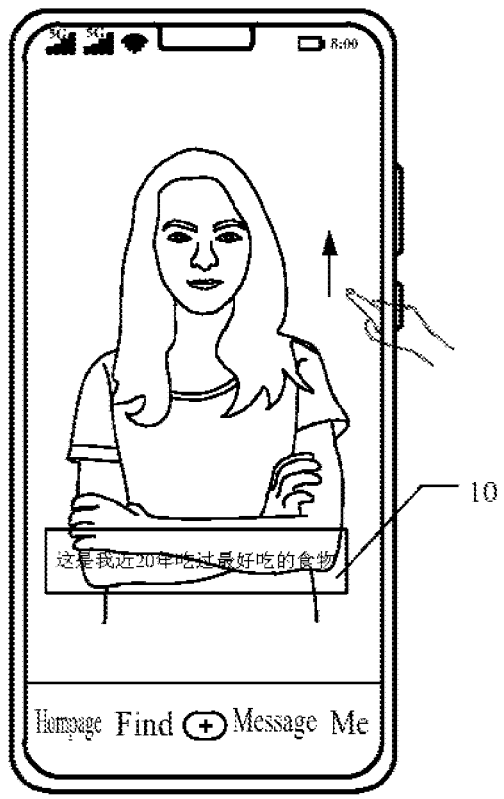
FIG. 1 is a diagram of an application scenario provided by the present disclosure.

FIG. 1 shows a diagram of an application scenario provided by the present disclosure. The present disclosure relates to a scenario in which a user watches a video using an application (e.g., a video app). It should be noted that FIG. 1 illustrates a user swiping a finger upwards to view a video, among other possible implementations, it could also be swiping a finger downwards, swiping a finger to the left or swiping a finger to the right, FIG. 1 is only an example and does not constitute a limitation of the present disclosure. In the prior art, the user is unable to adjust the subtitles of the video, resulting in the following problems that the user may encounter while browsing the video: the subtitles of the video obscure the image and affect the user's normal viewing. In addition, the language of the video can cause a situation where the user cannot understand it, as well as the language of the subtitles can cause a situation where the user cannot read it.

For this reason, the present disclosure proposes to add a subtitle widget 10 to the application, which is presented as a subtitle box or subtitle area on the user interface. When the user clicks on the subtitle widget 10, a settings pop-up window is displayed in the adjacent area of the subtitle widget 10, through which the user can set the subtitle widget 10 to be hidden, thus alleviating the problem of the subtitles obscuring the image and affecting the user from viewing it properly. The user can also use the setting pop-up window to set the subtitles of the video to a language familiar to the user, thus solving the problem of the user not being able to read the subtitles. The user can also set the audio of the video to a language familiar to the user through the setting pop-up window to solve the problem of the user not being able to understand the subtitles.

The method provided in the present disclosure can be performed by a terminal device in the form of, but not limited to, a smartphone, a tablet, a laptop, a wearable electronic device or a smart home device, etc. The present disclosure is not limited to the form of the terminal device.

The technical solutions of the present disclosure and how the technical solutions of the present disclosure solve the above technical problems are described in detail below with specific embodiments. The following specific embodiments may be combined with each other, and the same or similar concepts or processes may not be repeated in some embodiments. Embodiments of the present disclosure will be described below in conjunction with the accompanying drawings.

Figure 2:
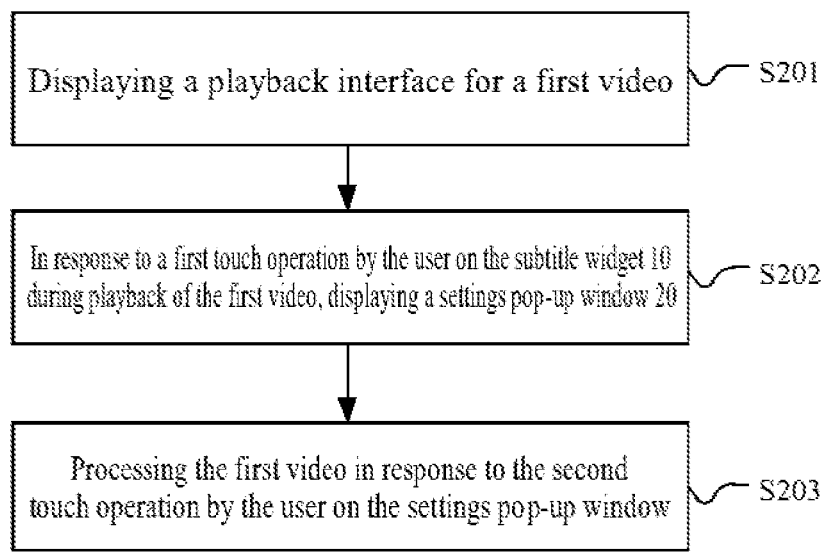
FIG. 2 is a schematic diagram of the flow of one embodiment of the video processing method provided by the present disclosure.

FIG. 2 is a schematic diagram of the process of embodiment 1 of the video processing method provided by the present disclosure. It specifically comprises:

S201, displaying a playback interface for a first video wherein the first video may comprise any of the videos played in the application. For example, the terminal device displays the playback interface of the first video and starts to play the first video after receiving a user-triggered command to open the first video. The playback interface of the first video is displayed with a subtitle widget 10, which may be used to display subtitles for the first video.

S202, in response to a first touch operation by the user on the subtitle widget 10 during playback of the first video, displaying a settings pop-up window 20. The settings pop-up window 20 is used by the user to set the subtitle language of the first video and/or to set the subtitle widget 10 to be hiding. The settings pop-up 20 may be located in an adjacent area of the subtitle widget 10 and may be adjusted according to the position of the subtitle widget 10. For example, when the subtitle widget 10 is located below the playback interface, the settings pop-up 20 may be displayed above the subtitle widget 10; when the subtitle widget 10 is located in the area above the playback interface, the settings pop-up window 20 may be displayed below the subtitle widget 10 to avoid the problem of not being able to be accommodated by the playback interface.

Figure 3:
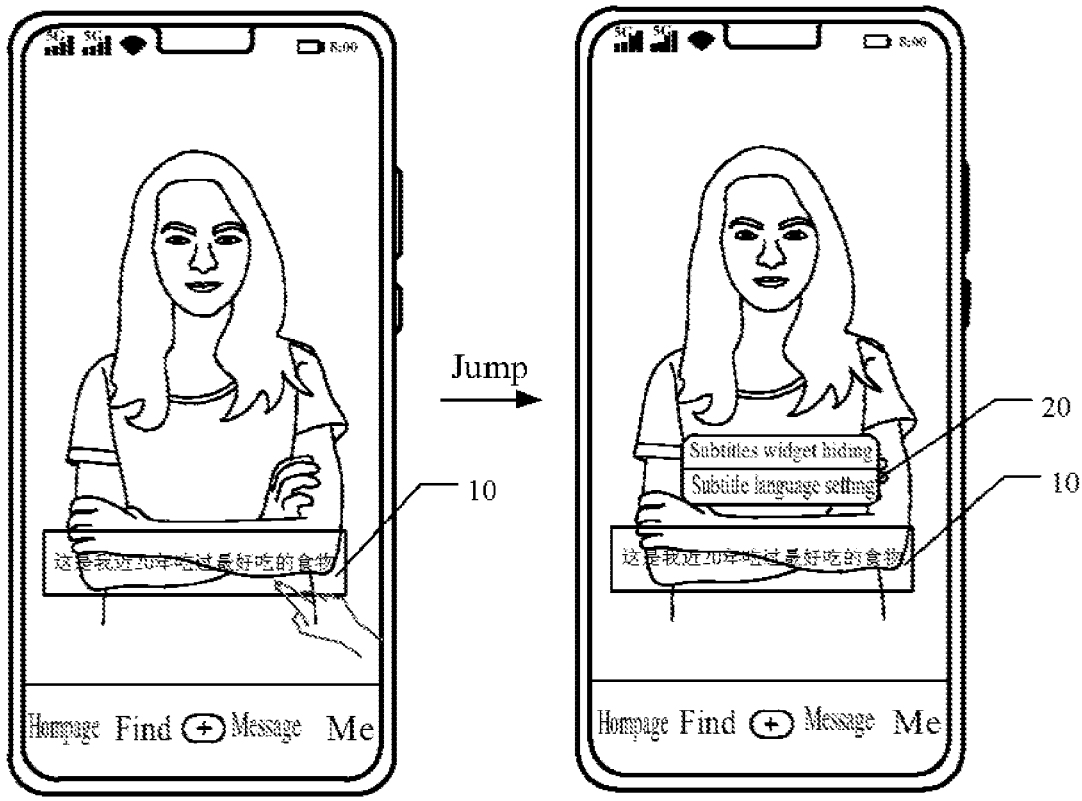
FIG. 3 is a schematic diagram of a first touch operation provided by the present disclosure.

In one possible embodiment, the first touch operation may comprise a click operation, see FIG. 3, wherein after the user clicks on the subtitle widget 10 during the first video playback and in response to the click operation, a settings pop-up window 20 may be displayed in an adjacent area of the subtitle widget 10 for the user to view. In one embodiment, the settings pop-up window 20 may include at least one of a subtitle widget hiding option, a subtitle language setting option, and an audio switch option.

S203, processing the first video in response to the second touch operation by the user on the settings pop-up window.

Specifically, when the user wants to hide the subtitle widget 10, a second touch operation may be performed on the subtitle widget hiding option, and in response to the second touch operation, the terminal device may hide the subtitle widget 10. When the user would like to change the subtitle language, a second touch operation may be performed on the subtitle language setting option, and in response to the second touch operation, the terminal device may update the subtitles to the subtitle language triggered by the second touch operation. When the user wants to change the audio language, a second touch operation can be performed on the audio switch option, and in response to the second touch operation, the terminal device can update the audio to the audio corresponding to the audio switch option.

The video processing method provided by the present disclosure allows the user to hide the subtitle widget 10 and change the subtitle language as well as the audio language, greatly enhancing the user experience.

Figure 4:
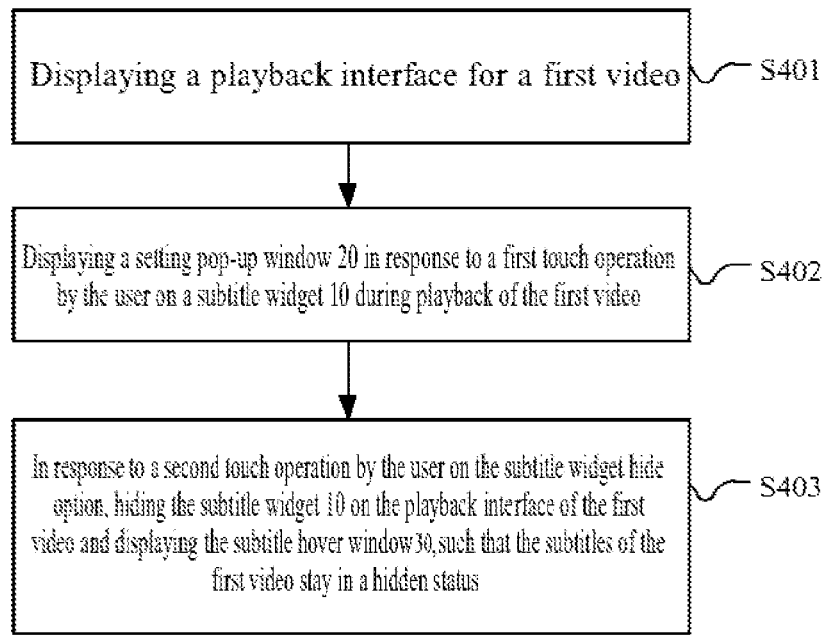
FIG. 4 is a schematic diagram of the flow of one embodiment of the video processing method provided by the present disclosure.

FIG. 4 is a flow diagram of Embodiment 2 of the video processing method provided by the present disclosure. This embodiment provides a detailed description of the solution for achieving the hide of subtitle widgets 10. It specifically comprises:

S401, displaying a playback interface for the first video.

S402, displaying a setting pop-up window 20 in response to a first touch operation by the user on the subtitle widget 10 during playback of the first video.

The implementation of S401-S402 is described in the above embodiment and will not be repeated herein.

S403, in response to a second touch operation by the user on the subtitle widget hide option, hiding the subtitle widget 10 on the playback interface of the first video and displaying the subtitle hover window 3, such that the subtitles of the first video stay in a hiding status.

Figure 5:
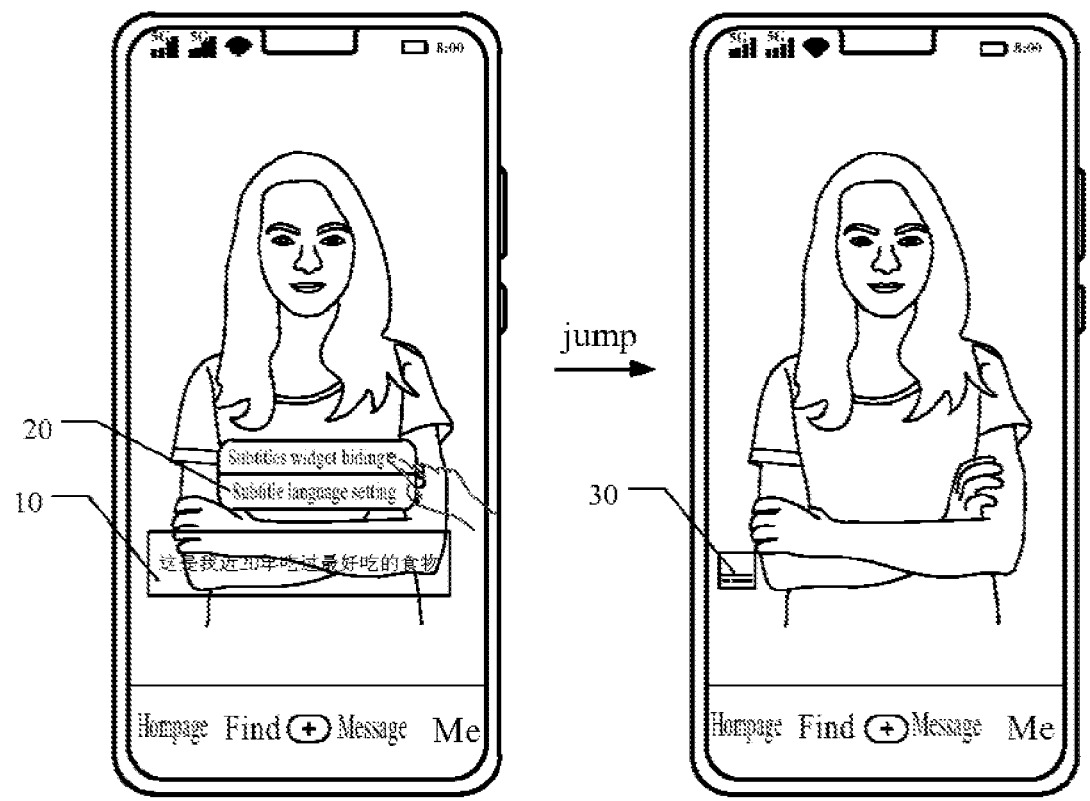
FIG. 5 is a schematic diagram 1 of a second touch operation provided by the present disclosure.

In one possible embodiment, the second touch operation may be a click operation. Referring to FIG. 5, after the user clicks on the subtitle widget hiding option, in response to the click operation, the terminal device hides the subtitle widget 10 on the playback interface of the first video and displays the subtitle hover window 30. As can be appreciated, the subtitle widget 10 may be used to display subtitles, and when the subtitle widget 10 is hiding, the subtitles of the first video stay in a hiding status, thus avoiding the problem that the subtitles obscure the image and prevent the user from viewing it properly.

Furthermore, in one embodiment, the location at which the caption hover window displays can be set according to the position of the subtitle widget 10. For example, the caption hover window may be displayed at the location where the caption module is displayed. When the subtitle widget 10 is located below the playback interface, the subtitle hover window may be displayed in the area below the playback interface; when the subtitle widget 10 is located in the area above the playback interface, the subtitle hover window may be displayed in the area above the playback interface accordingly.

Figure 6:
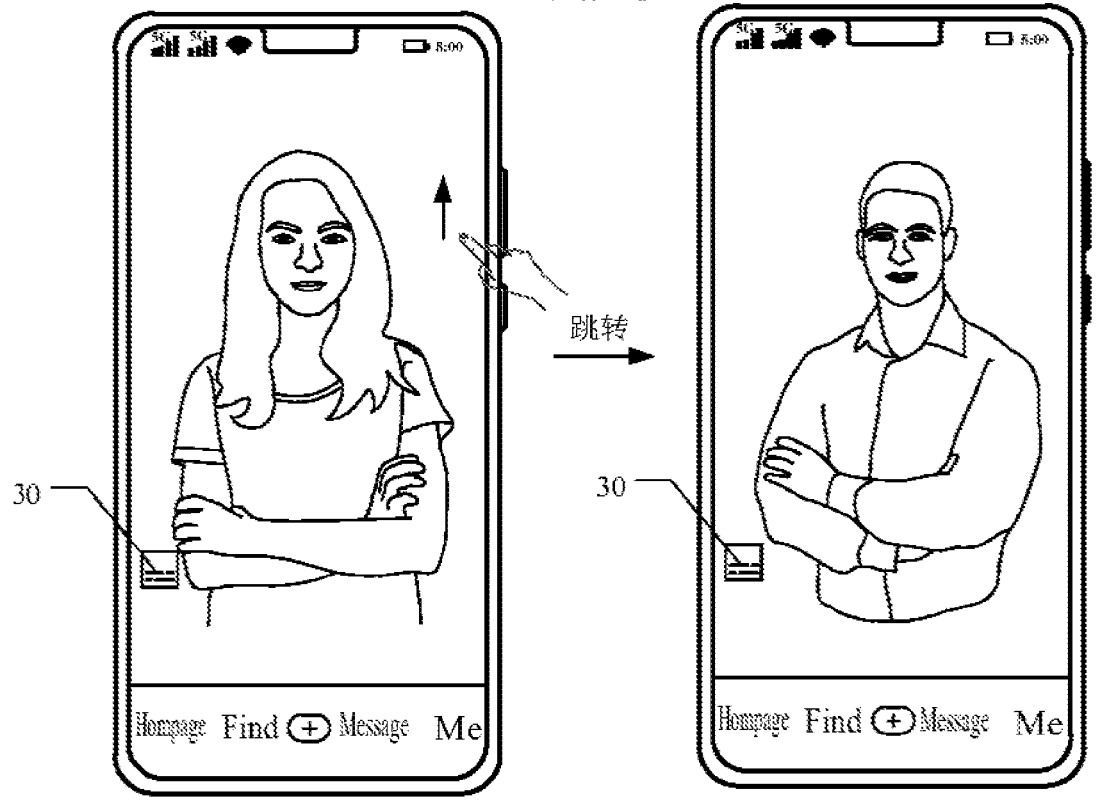
FIG. 6 is a schematic diagram of a second video inheritance subtitle widget hiding setting provided by the present disclosure.

When the user wants to browse the next video, the video switch command can be triggered by the operation of sliding the finger upwards as illustrated in FIG. 1, and the terminal device will start playing the next video after receiving the video switch command, and the next video will be referred to as the second video in the present disclosure for convenience of illustration. The terminal device can check whether the second video is configured with subtitles in the configuration list corresponding to the second video, and if the second video does not have subtitles, the subtitle widget 10 will not be displayed; if the second video has subtitles, see FIG. 6, the subtitle widget 10 can continue to be hiding and the subtitle hover window 30 can continue to be displayed on the playback interface of the second video, avoiding the user to repeat the settings shown in FIG. 3 and FIG. 5 for the second video and thus improves the user experience.

It should be noted that the subtitles of the video may be set by the creator when creating the video or may be automatically generated, and the present disclosure does not limit the source of the subtitles. Optionally, if the subtitles are automatically generated, a specific icon may be displayed in the subtitle widget 10 to indicate that the subtitles are automatically generated.

In the video processing method provided by the present disclosure, when the user clicks on the option to hide the subtitle widget hiding option in the setting pop-up window, the terminal device hides the subtitle widget and displays the subtitle hover window, so that the subtitle of the first video stay in a hiding status, thus avoiding the problem that the subtitles obscure the image and prevent the user from viewing it properly, and after the terminal device hides the subtitle widget, when the user browses to subsequent videos, the subtitle widget is still hiding on the playback interface, so that the user does not have to repeat the setting for each video browsed, which enhances the user experience.

Figure 7:
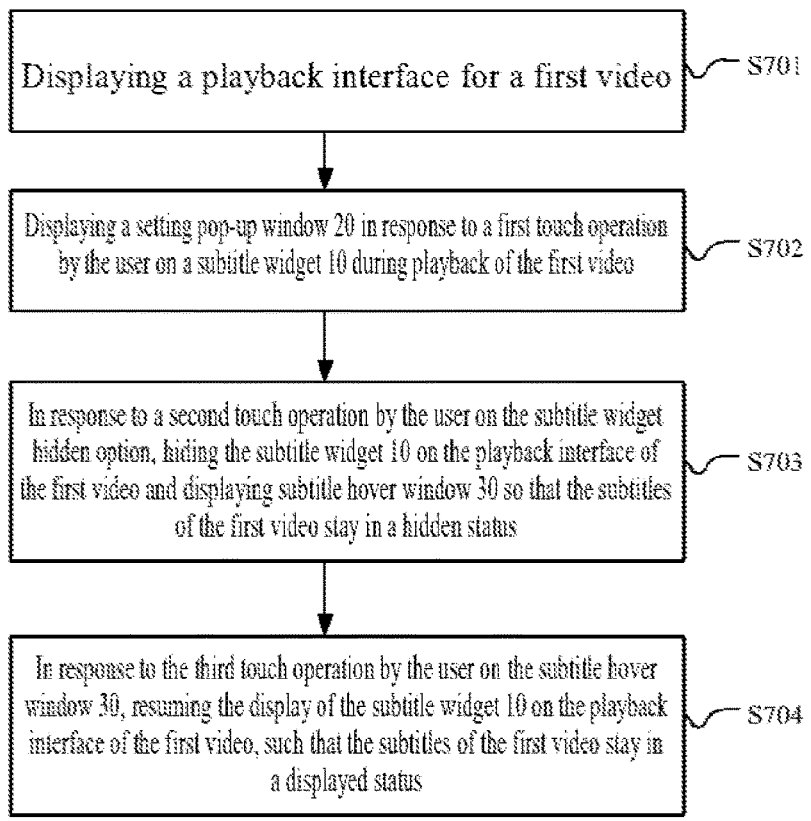
FIG. 7 is a schematic diagram of the flow of one embodiment of the video processing method provided by the present disclosure.

FIG. 7 is a schematic flow diagram of Embodiment 3 of the video processing method provided by the present disclosure. It specifically includes:

S701, displaying a playback interface for the first video.

S702, displaying a setting pop-up window 20 in response to a first touch operation by the user on the subtitle widget 10 during playback of the first video, the setting pop-up window 20 being used by the user to set the subtitle language of the first video and/or to set the subtitle widget 10 to be hiding.

S703, in response to a second touch operation by the user on the subtitle widget hiding option, the subtitle widget 10 is hiding and the subtitle hover window 30 is displayed on the playback interface of the first video so that the subtitles of the first video stay in a hiding status.

S701-S703 are implemented as described in S401-S403 in the above embodiments and will not be repeated in the present disclosure.

S704, in response to the third touch operation by the user on the subtitle hover window 30, the display of the subtitle widget 10 is resumed on the playback interface of the first video, such that the subtitles of the first video stay in a displayed status.

Figure 8:
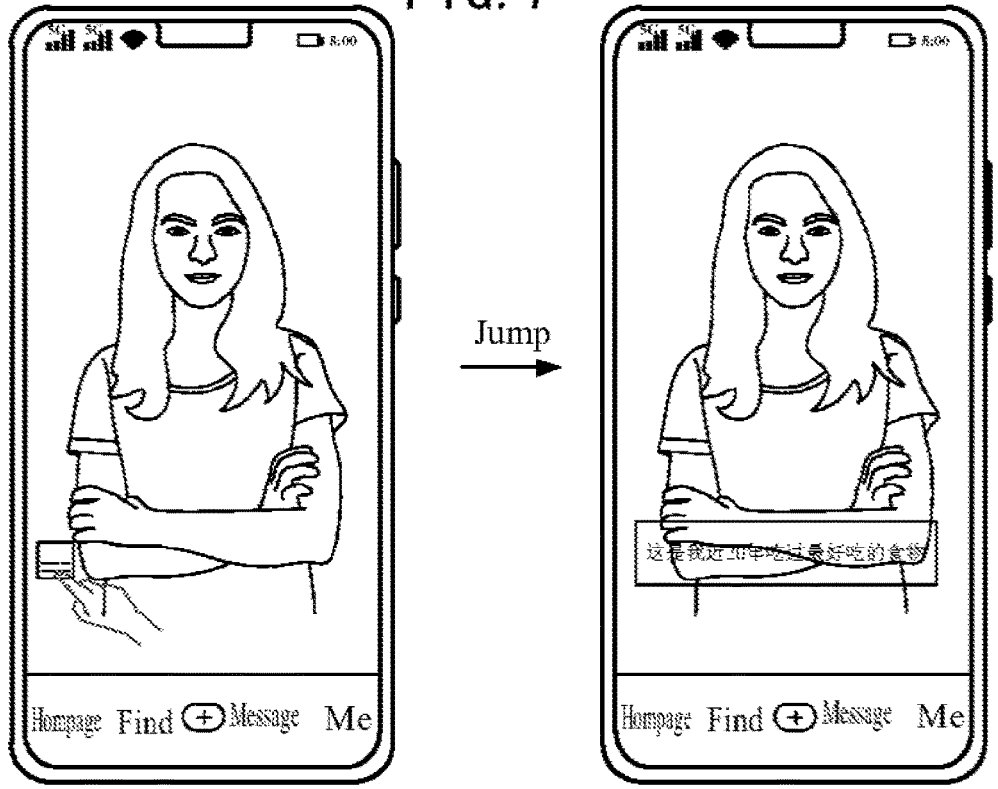
FIG. 8 is a schematic diagram of a third touch operation provided by the present disclosure.

In one possible embodiment, the third touch operation may be a click operation. Referring to FIG. 8, after the user clicks on the subtitle hover window 30 and in response to the click operation, the terminal device resumes displaying the subtitle widget 10 on the playback interface of the first video.

In one embodiment, the video frames and subtitles in the first video may have a one-to-one correspondence, that is to say, the subtitles displayed by the subtitle widget 10 in the playback interface of the first video are corresponding to the current video frames after the display of the subtitle widget 10 is resumed. In other words, the subtitles displayed by the subtitle widget 10 are synchronized with the current video frame. The above operation enables the user to freely switch between the hiding and displayed status of the subtitles, further enhancing the user experience.

Figure 9:
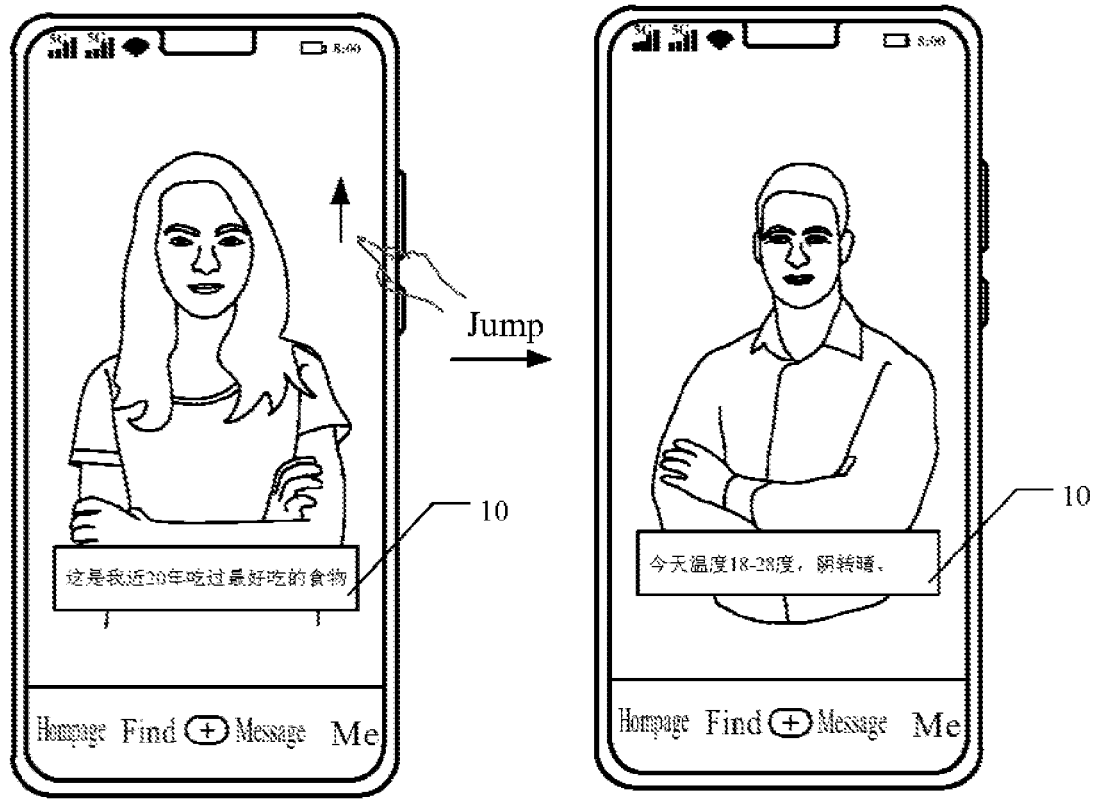
FIG. 9 is a schematic diagram of a second video inheritance subtitle widget display setting provided by the present disclosure.

Similar to the second video's subtitle inheritance hiding status in the above embodiment, in the case where the user makes the terminal device to resume displaying the subtitle widget 10 by the operation shown in FIG. 8, the terminal device starts playing the second video after receiving a video switch command, and the terminal device can query whether the second video is configured with subtitles in the configuration list corresponding to the second video, and if the second video does not have subtitles, the subtitle widget 10 will not be displayed; if it is determined by querying the configuration list that the second video does have subtitles, then see FIG. 9, the subtitle widget 10 will continue to be displayed on the playback interface of the second video.

In one possible implementation, the terminal device may set the value of the first parameter to a first preset value when the terminal device sets the subtitle widget 10 to be hiding on the playback interface of the first video, and may set the value of the first parameter to a second preset value when resuming display of the subtitle widget 10. After the terminal device receives the video switch command, in the case that the second video has subtitles, it may first find the value of the first parameter, and if the value of the first parameter is the first preset value, the terminal device may hide the subtitle widget 10 on the playback interface of the second video and display the subtitle hover window 30; if the value of the first parameter is the second preset value, the subtitle widget 10 will be displayed on the playback interface of the second video.

Wherein the first parameter comprises a parameter associated with a status of the subtitle widget 10, the first parameter may be a parameter in a software package of the application, and the first parameter may be a parameter in a lightweight storage class (Shared Preferences) on an operating system platform of the terminal device.

The present disclosure provides a video processing method in which the terminal device can resume displaying the subtitle widget after the user clicks on the subtitle hover window. Embodiments of the present disclosure further enhance the user experience by enabling the user to freely switch between the hiding and displayed status of the subtitles.

Figure 10:
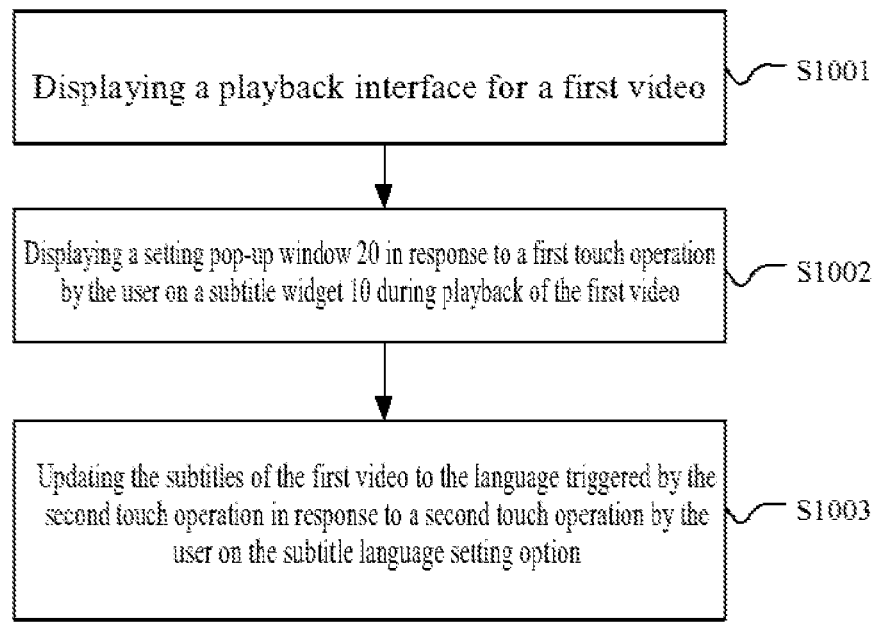
FIG. 10 is a schematic diagram of the flow of one embodiment of the video processing method provided by the present disclosure.

FIG. 10 shows a flow diagram of Embodiment 4 of the video processing method provided in the present disclosure. This embodiment provides a detailed description of the scheme for implementing subtitle language settings. It specifically comprises:

S1001, displaying a playback interface for a first video.

S1002, displaying a setting pop-up window 20 in response to a first touch operation by the user on a subtitle widget 10 during playback of the first video, the setting pop-up window 20 being used by the user to set the subtitle language of the first video and/or to set the subtitle widget 10 to be hiding.

The implementation of S1001-S1002 can be referred to S201-S202 in the above embodiments and the disclosure will not be repeated herein.

S1003, updating the subtitles of the first video to the language triggered by the second touch operation in response to a second touch operation by the user on the subtitle language setting option.

Figure 11A:
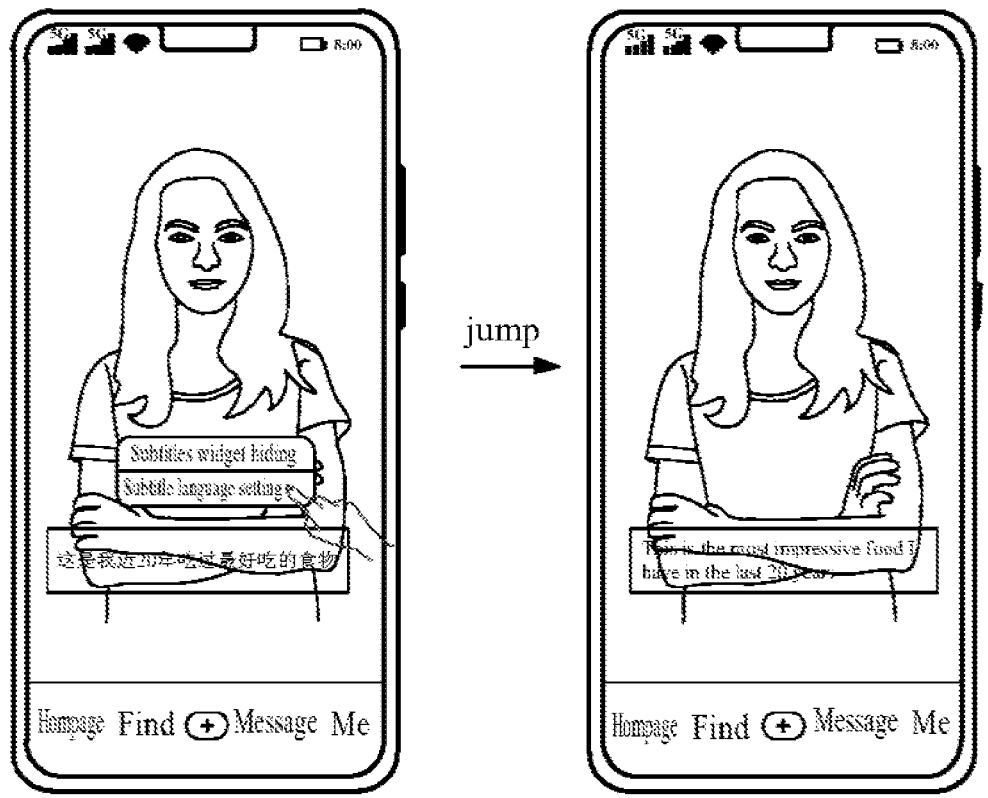
FIG. 11A is a schematic diagram 2 of a second touch operation provided by the present disclosure.

In one possible embodiment, the second touch operation may include a click operation. The subtitle language setting option may include "Original Subtitles" or "Translated Subtitles" (for example, depending on the subtitle language currently displayed in the video interface, the subtitle language setting option may alternately display "Original Subtitles" or "Translated Subtitles"), see FIG. 11A, the subtitle language setting option is displayed as "Translated Subtitles" when the first video is currently displayed with original subtitles, and when the user clicks on "Translated Subtitles", the terminal device will update the subtitles to translated subtitles. Correspondingly, the subtitle language setting option is displayed as "Original Subtitles" when the first video is currently displayed with "Translated Subtitles", and when the user clicks on "Original Subtitles", the terminal device will update the subtitles to original subtitles. In addition, "Translated Subtitles" can be set to include subtitles in a variety of language types, and the disclosure does not limit this.

Figure 11B:
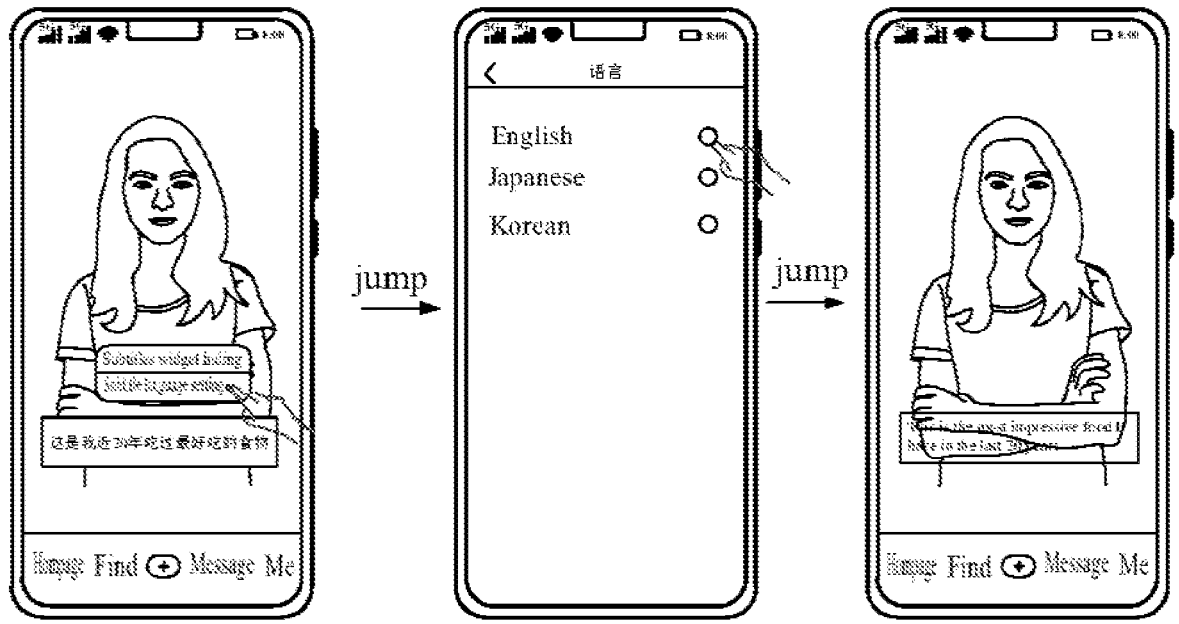
FIG. 11B is a schematic diagram 3 of the second touch operation provided by the present disclosure.

In another possible implementation, see FIG. 11B, the second touch operation includes a user click on the subtitle language setting option and a click on a specific language on the jumped interface, FIG. 11B illustrates the specific language clicked on by the user as English. The terminal device updates the current subtitles to English subtitles after receiving these two click operations. It should be understood by those skilled in the art that the interface that jumps to upon receiving a click operation on the subtitle language setting option is not limited to the interface shown in FIG. 11B, but may also include implementations such as pop-up windows, and the present disclosure does not limit this.

Figure 11C:
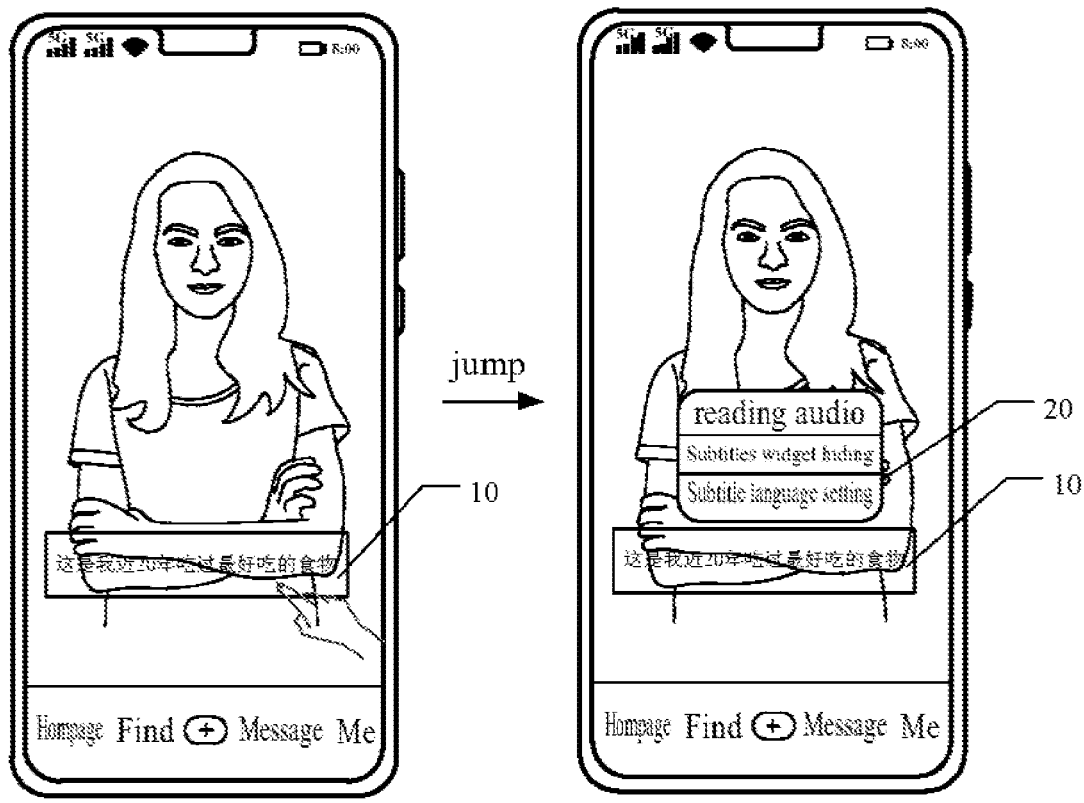
FIG. 11C is a schematic diagram of a settings pop-up window containing audio switch options provided by the present disclosure.

In one embodiment, the setting pop-up window 20 may also include an audio switch option where, in response to a user touch operation on the audio switch option, the terminal device may update the audio of the first video to the audio corresponding to the audio switch option. Specifically, the audio switch option includes "original audio" or "reading audio" (e.g., depending on the audio of the current video, the audio switch option may alternately display "original audio" or "reading audio"), see FIG. 11C, when the current audio of the first video is the original audio, the subtitle language setting option is "reading audio", the user clicks on the "reading audio", the terminal device will update the audio of the first video to reading audio. Accordingly, when the current audio of the first video is reading audio, the subtitle language setting option is "Original audio" and the user clicks on this "Original audio", the terminal device will update the audio of the first video to the original audio. In one embodiment, the reading audio includes the audio that reads the translated subtitles.

The video processing method provided in the present disclosure, when the user performs a second touch operation on the subtitle language setting option, the terminal device may update the subtitle of the first video to the language triggered by the second touch operation, enabling the user to freely select the language of the subtitle, avoiding the problem of poor user experience caused by the user not understanding the language of the subtitle. In addition, when the user performs a second touch operation on the audio switch option, the terminal device can update the audio of the first video to the audio corresponding to the audio switch option, which can avoid the problem of poor user experience caused by the user not understanding the language of the current audio.

Embodiment 5

Figure 12:
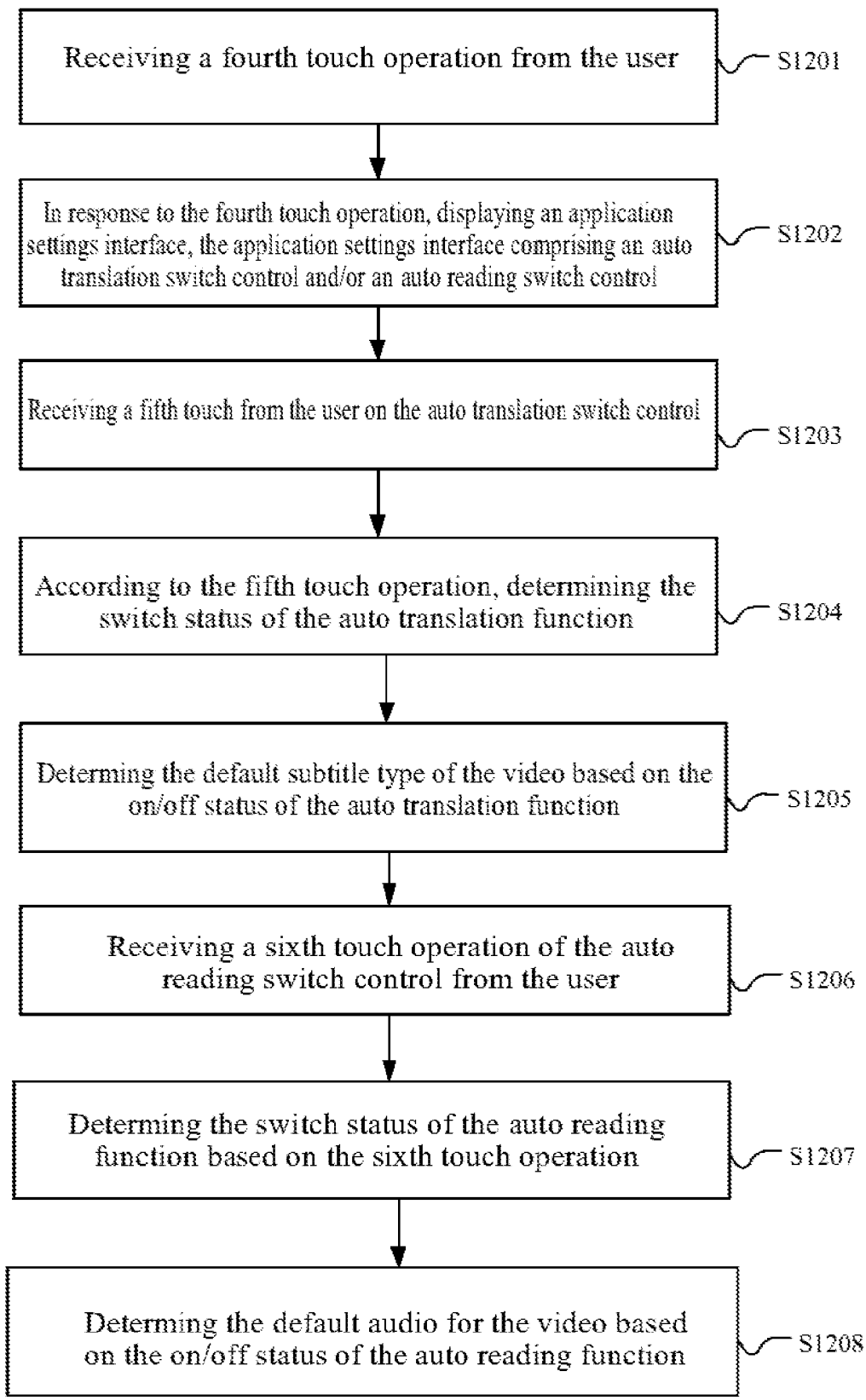
FIG. 12 is a schematic diagram of the flow of one embodiment of the video processing method provided by the present disclosure.

FIG. 12 is a schematic flow diagram of Embodiment 5 of the video processing method provided in the present disclosure. It specifically includes:

S1201, receiving a fourth touch operation from the user.

S1202, in response to the fourth touch operation, displaying an application settings interface, the application settings interface comprising an auto translation switch control and/or an auto reading switch control.

Figure 13:
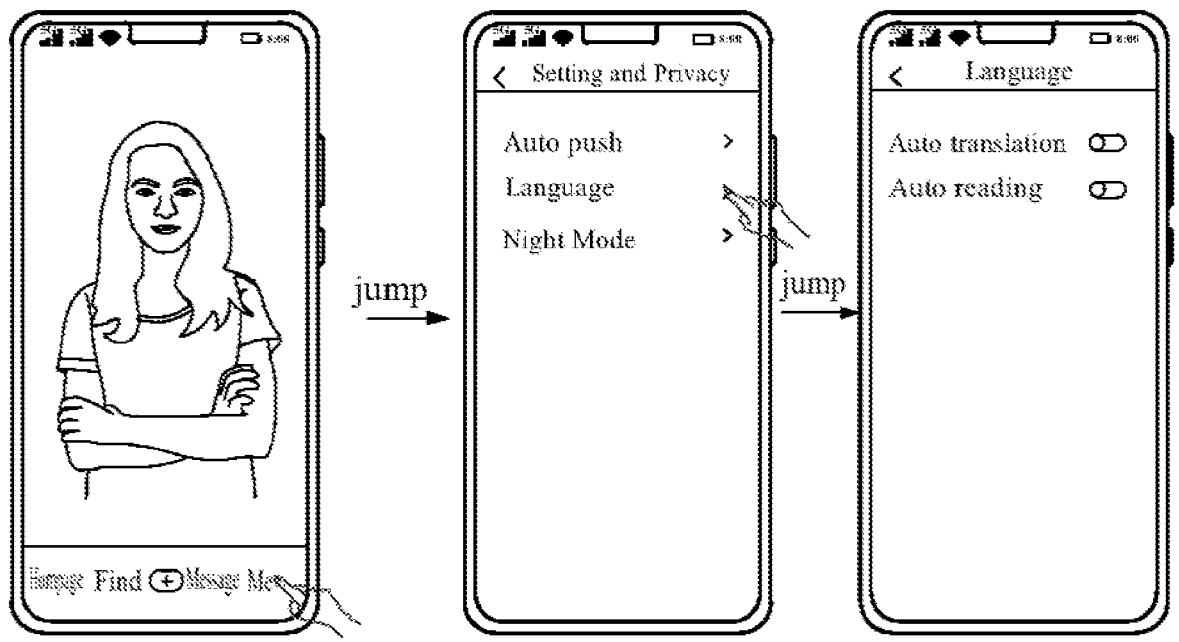
FIG. 13 is a schematic diagram of a fourth touch operation provided by the present disclosure.

In one possible implementation, see FIG. 13, the fourth touch action includes the user clicking on a first control on the playback screen, for example, the control in the bottom right corner on the interface of the terminal device, as shown in FIG. 13, and clicking on a control identified as "Language" on the settings interface (for example, the settings and privacy page) after the jump. The application settings interface in S1202 may be the interface shown on the far right in FIG. 13.

S1203, receiving a fifth touch from the user on the auto translation switch control.

S1204, according to the fifth touch operation, determining the switch status of the auto translation function.

In one possible implementation, when the user switches the auto translation control to the left, the auto translation function is determined to be off, and when the user switches the auto translation control to the right, the auto translation function is determined to be on. Alternatively, when the user switches the auto translation control to the left, the auto translation function is determined to be on, and when the user switches the auto translation control to the right, the auto translation function is determined to be off. The present disclosure is not limited in this respect.

S1205, determining the default subtitle type of the video based on the on/off status of the auto translation function.

In one possible implementation, if the auto translation function is on, the default subtitle is determined to be a translated subtitle, and in the case of a subtitle display, all subsequent videos viewed by the user will display the translated subtitle by default; if the auto translation function is off, the default subtitle is determined to be the original subtitle, and in the case of a subtitle display, all subsequent videos viewed by the user will display the original subtitle by default.

S1206, receiving a sixth touch operation of the auto reading switch control from the user.

It should be noted that as the reading audio is a reading of the translated subtitles, if the user turns off the auto translation function, there is no reading audio function. Therefore, the auto reading switch control will only respond to the user's touch operation when the auto translation function is on, i.e., the auto reading switch control is active when the auto translation function is on, and when the auto translation function is off, the auto reading switch control is grayed out, and the terminal device will not respond to the user's touch operation for the auto reading switch control at this time.

S1207, based on the sixth touch operation, determining the switch status of the auto reading function.

In one possible implementation, as shown in the rightmost diagram in FIG. 13, when the user switches the auto reading control to the left, the auto reading function is determined to be off, and when the user switches the auto reading control to the right, the auto reading function is determined to be on. Alternatively, when the user switches the auto reading control to the left, the auto reading function is determined to be on, and when the user switches the auto reading control to the right, the auto reading function is determined to be off. The disclosure is not limited in this respect.

S1208, determining the default audio for the video based on the on/off status of the auto reading function.

In one possible implementation, if the auto reading function is on, the default audio is determined to be the reading audio, and all subsequent videos viewed by the user will play the reading audio by default; if the auto reading function is off, the default audio is determined to be the original audio, and all subsequent videos viewed by the user will play the original audio by default.

The above implementation is only exemplary, and embodiments of the present disclosure may also determine the default audio for a video based on the on/off status of the auto reading function according to practical needs. For example, if the auto reading function is on, the default audio may also be determined to be the original audio of the video, and all subsequent videos viewed by the user will play the original audio of the video.

The method provided by the present embodiment allows the user to set the switch for the auto-translation function and the auto-reading function, and determines the default subtitle of the video and the default audio of the video through switch setting by the user on these two functions, further enhancing the interaction flexibility and providing the user with more functionality to improve the user experience.

Figure 14:
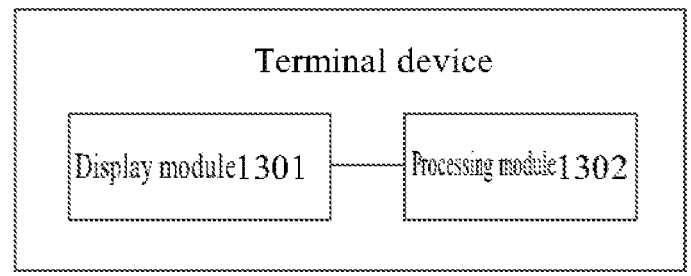
FIG. 14 is a schematic diagram of the structure of the terminal device provided by the present disclosure.

FIG. 14 is a schematic diagram of the structure of the terminal device provided by the present disclosure. As shown in FIG. 14, the terminal device provided by the present disclosure, comprises
- a display module 1301 for displaying a playback interface of a first video, the playback interface of the first video displaying a subtitle widget, the subtitle widget used to display subtitles for the first video
- display module 1301, further for displaying, in response to a first touch operation by the user on the subtitle widget during playback of the first video, a setting pop-up window, the setting pop-up window used by the user to set the subtitle language of the first video and/or to set the subtitle widget to be hiding:
- a processing module 1302 for processing the first video in response to a second touch operation by the user on the setting pop-up window;
- optionally, the setting pop-up window comprising: a subtitle widget hiding option, the second touch operation comprising a touch operation by the user on the subtitle widget hiding option;
- Processing module 1302, is specifically used for:
- hiding the subtitle widget on the playback interface of the first video and displaying a subtitle hover window such that the subtitles of the first video are in a hiding status.

Optionally, the processing module 1302 is further used for:
- receiving a user-triggered video switch command;
- playing the second video and continuing to hide the subtitle widget on the playback interface of the second video and display the subtitle hover window.

Optionally, the processing module 1302 is specifically used for:
- querying the value of a first parameter, the first parameter comprising a parameter associated with a status of the subtitle widget;
- if the value of the first parameter is a first predetermined value, continuing to hide the subtitle widget on the playback interface of the second video and display the subtitle hover window.

Optionally, the display module 1301 is further used for
- in response to a third touch operation by the user of the subtitle hover window, resuming displaying the subtitle widget on the playback interface of the first video, such that the subtitles of the first video stay in a displayed status,
- optionally, the subtitles displayed by the subtitle widget being synchronized with the video frames in the currently playing first video after the subtitle widget resumes the display.

Optionally, the processing module 1302 is further used for:
- receiving a user-triggered video switch command.
- playing a second video and continuing to display the subtitle widget on the playback interface of the second video.

Optionally, the processing module 1302 is specifically used for.
- querying the value of a first parameter, the first parameter comprising a parameter associated with a status of the subtitle widget;
- If the value of the first parameter is a second preset value, continuing to display the subtitle widget on the playback interface of the second video.

Optionally, the setting pop-up window comprises a subtitle language setting option, the second touch operation comprises a touch operation by the user on the subtitle language setting option, the processing module 1302 is further used for:
- updating the subtitles of the first video to the subtitle language triggered by the second touch operation.

Optionally, the setting pop-up window comprises an audio switch option, the second touch operation comprising a touch operation by the user on the audio switch option; the processing module 1302 is further used for:
- updating the audio of the first video to the audio corresponding to the audio switch option.

Optionally, the display module 1301 is further used for:
- receiving a fourth touch operation from the user.
- displaying, in response to the fourth touch operation, an application settings interface, the application settings interface comprising an auto translation switch control and/or an auto reading switch control.

Optionally, the processing module 1302 is further used to.
- receiving a fifth touch operation of the auto translation switch control from a user
- determining the on/off status of the auto translation function based on the fifth touch operation
- determine a default subtitle type for the video based on the on/off status of the auto translation function.

Optionally, the processing module 1302 is specifically used for:
- determining that the default subtitle is a translated subtitle if the auto translation function is on;
- determining that the default subtitle is an original subtitle if the auto translation function is off;

Optionally, the application setting interface comprises an auto reading switch control, the auto reading switch control stays in active status when the auto translation function is on, the processing module 1302 is further used for:
- receiving a sixth touch operation by the user on the auto reading switch control;
- determining, based on the sixth touch operation, the on/off status of the auto reading function determining the default audio for the video based on the switch status of the auto reading function.

Optionally, the processing module 1302 is specifically used for:
- determining that the default audio is a reading audio if the auto reading function is on;
- determining that the default audio is an original audio if the auto reading function is off.

The terminal device provided by this embodiment can be used to perform the steps in any of the above method embodiments, which are implemented in a similar manner and with similar technical effect and will not be repeated herein.

Figure 15:
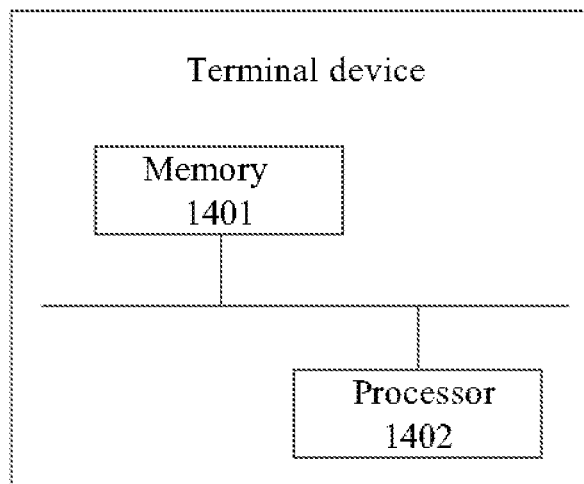
FIG. 15 is a schematic diagram of the hardware structure of the terminal device provided by the present disclosure.

FIG. 15 shows a schematic diagram of the hardware structure of the terminal device provided by the present application. As shown in FIG. 15, the terminal device of an embodiment of the present disclosure may comprise:

a memory 1401 for storing program instructions.

a processor 1402 for implementing the video processing method described in any of the above embodiments when the program instructions are executed, the specific implementation principles of which can be found in the above embodiments and which are not repeated herein.

The present disclosure provides a computer readable storage medium having a computer program stored thereon, the computer program when executed by the processor implements the video processing method described in any of the above embodiments.

The present disclosure also provides a program product, the program product comprising a computer program, the computer program is stored in the readable storage medium, the computer program is readable from the readable storage medium by at least one processor, the at least one processor executes the computer program causing the terminal device to implement the video processing method described in any of the above embodiments.

In several embodiments provided by the present disclosure, it should be understood that the disclosed apparatus and method, may be implemented in other ways. For example, the embodiments of the devices described above are merely schematic, for example, the division of the units described, which is only a logical functional division, can be divided in other ways when practically implemented, for example multiple units or components can be combined or can be integrated into another system, or some features can be ignored, or not implemented. On another point, the mutual coupling or direct coupling or communication connections shown or discussed may be indirect coupling or communication connections via some interface, device or unit, which may be electrical, mechanical or otherwise.

The units illustrated as separate components may or may not be physically separate and the components shown as units may or may not be physical units, i.e. may be located in one place or may also be distributed over a plurality of network units. Some or all of these units may be selected according to practical needs to achieve the purpose of the present embodiment solution.

Alternatively, the various functional units in the various embodiments of the present disclosure may be integrated in a one processing unit, or the individual units may have separate physical presences, or two or more units may be integrated in a single unit. The above integrated units can be implemented either in the form of hardware or in the form of hardware plus a software functional unit.

The above integrated unit in the form of a software functional unit can be stored in a computer readable storage medium. The aforementioned software functional unit stored in a storage medium comprises a number of instructions to enable a computer device (which may be a personal computer, a server, or a network device, etc.) or a processor to perform some of the steps of the method described in various embodiments of the present disclosure. The aforementioned storage media include USB flash drives, mobile hard drives, Read-Only Memory (ROM), Random Access Memory (RAM), disks or CD-ROMs, and various other media that can store program code.

It should be understood that the processor described in the present disclosure may be a Central Processing Unit (CPU), but also other general purpose processors, Digital Signal Processors (DSP), Application Specific Integrated Circuits (ASIC), etc. The general purpose processor may be a microprocessor or the processor may also be any conventional processor, etc. The steps of the method disclosed in conjunction with the present disclosure may be embodied directly in a hardware processor for execution, or in a combination of hardware and software modules in the processor for execution.

Finally, it should be noted that the above embodiments are intended only to illustrate the technical solutions of the present disclosure and not to impose limitation; notwithstanding the detailed description of the present disclosure is made with reference to the preceding embodiments, it should be understood by a person of ordinary skill in the art that it is still possible to modify the technical solutions described in the preceding embodiments or to replace some or all of the technical features thereof with equivalent ones; and that such modifications or replacements do not take the essence of the corresponding technical solutions out of the scope of the technical solutions of the embodiments of the present disclosure.

What is claimed is:

1. A video processing method, comprising:
    displaying a playback interface of a first video, the playback interface of the first video displaying a subtitle widget, the subtitle widget used for displaying the subtitles of the first video;
    displaying a setting pop-up window, in response to a first touch operation by the user on the subtitle widget during playback of the first video, wherein the subtitle widget has already displayed the subtitle of the first video before the first touch operation, the setting pop-up window used for the user to set the subtitle language of the first video and to set the subtitle widget to be hiding, wherein a value of a first parameter is set to a first preset value when the subtitle widget is set to be hiding, and the value of the first parameter is set to a second preset value when resuming the display of the subtitle widget, wherein the first parameter is a parameter in a software package of an application for playback of videos and comprises a parameter associated with a status of the subtitle widget; and
    processing the first video in response to a second touch operation by the user on the setting pop-up window, wherein processing the first video comprises:
    hiding the subtitle widget on the playback interface of the first video and displaying a subtitle hover window such that the subtitles of the first video stay in a hiding status,
    receiving a user-triggered video switch command, and
    displaying a second video, wherein the displaying the second video comprises:
        in response to the second video having subtitles, querying a value of the first parameter;
        in response to the value of the first parameter being the first preset value, continuing to hide the subtitle widget on the playback interface of the second video and display the subtitle hover window; and
        in response to the value of the first parameter being the second preset value, displaying the subtitle widget on the playback interface of the second video.

2. The method according to claim 1, wherein the setting pop-up window comprises a subtitle widget hiding option, the second touch operation comprises a touch operation by the user on the subtitle widget hiding option.

3. The method according to claim 1, further comprising:
    resuming, in response to a third touch operation by the user on the subtitle hover window, to display the subtitle widget on the playback interface of the first video, such that the subtitles of the first video stay in a display status.

4. The method according to claim 3, wherein the subtitles displayed by the subtitle widget are synchronized with the video frames in the currently playing first video after the subtitle widget resumes the display.

5. The method according to claim 3, further comprising:
receiving a user-triggered video switch command; and
displaying a second video and continuing to display the subtitle widget on the playback interface of the second video.

6. The method according to claim 5, wherein continuing to display the subtitle widget on the playback interface of the second video comprises:
querying a value of the first parameter; and
if the value of the first parameter is a second predetermined value, continuing to display the subtitle widget on the playback interface of the second video.

7. The method according to claim 1, wherein the setting pop-up window comprises a subtitle language setting option, the second touch operation comprises a touch operation by the user on the subtitle language setting option; and
processing the first video comprises:
updating the subtitles of the first video to the subtitle language triggered by the second touch operation.

8. The method according to claim 1, wherein the setting pop-up window comprises an audio switch option and the second touch operation comprises a touch operation by the user on the audio switch option; and
processing the first video comprises:
updating the audio of the first video to the audio corresponding to the audio switch option.

9. The method according to claim 1, further comprising:
receiving a fourth touch operation from a user; and
displaying, in response to the fourth touch operation, an application settings interface, the application settings interface comprising an auto translation switch control and/or an auto reading switch control.

10. The method according to claim 9, wherein the application setting interface comprises an auto translation switch control, the method further comprising:
receiving a fifth touch operation by the user on the auto translation switch control;
determining, based on the fifth touch operation, an on/off status of the auto translation function; and
determining, based on the on/off status of the auto translation function, a default subtitle type for the video.

11. The method according to claim 10, wherein determining the default subtitle type of the video according to the on/off status of the auto translation function, comprises:
if the auto translation function is on, determining that the default subtitles are translated subtitles; and
if the auto translation function is off, determining that the default subtitles is original subtitles.

12. The method according to claim 9, wherein the application setting interface comprises an auto reading switch control, the auto reading switch control stays in an active status when the auto translation function is on, the method further comprising:
receiving a sixth touch operation by the user on the auto reading switch control;
determining, based on the sixth touch operation, an on/off status of the auto reading function; and
determining, based on the on/off status of the auto reading function, a default audio for the video.

13. The method according to claim 12, wherein determining, based on the on/off status of the auto reading function, a default audio for the video comprises:
determining that the default audio is a reading audio if the auto reading function is on; and
determining that the default audio is an original audio if the auto reading function is off.

14. A non-transitory computer readable storage medium having a computer program stored thereon, wherein the computer program when executed by a processor implements the method described in claim 1.

15. A terminal device, comprising:
a processor; and
a memory for storing instructions executable by the processor;
wherein the processor is configured to implement the method of claim 1 by executing the executable instructions.

16. A non-transitory computer readable storage medium having a computer program stored thereon, wherein the computer program when executed by a processor implements the method described in claim 3.

17. A non-transitory computer readable storage medium having a computer program stored thereon, wherein the computer program when executed by a processor implements the method described in claim 5.

18. A terminal device, comprising:
a processor; and
a memory for storing instructions executable by the processor;
wherein the processor is configured to implement the method of claim 3 by executing the executable instructions.

19. A terminal device, comprising:
a processor; and
a memory for storing instructions executable by the processor;
wherein the processor is configured to implement the method of claim 5 by executing the executable instructions.

20. A terminal device, comprising:
a display module for displaying a playback interface of a first video, the playback interface of the first video displaying a subtitle widget, the subtitle widget used for displaying subtitles for the first video; further for displaying a setting pop-up window in response to a first touch operation by the user on the subtitle widget during playback of the first video, wherein the subtitle widget has already displayed the subtitle of the first video before the first touch operation, the setting pop-up window used by a user to set the subtitle language of the first video and to set the subtitle widget to be hiding,
wherein a value of a first parameter is set to a first preset value when the subtitle widget is set to be hiding, and the value of the first parameter is set to a second preset value when resuming the display of the subtitle widget, wherein the first parameter is a parameter in a software package of an application for playback of videos and comprises a parameter associated with a status of the subtitle widget; and
a processing module for processing the first video in response to a second touch operation by the user on the setting pop-up window, wherein processing the first video comprises:

hiding the subtitle widget on the playback interface of the first video and displaying a subtitle hover window such that the subtitles of the first video stay in a hiding status,
receiving a user-triggered video switch command, and
displaying a second video, wherein the displaying the second video comprises:
  in response to the second video having subtitles, querying a value of the first parameter;
  in response to the value of the first parameter being the first preset value, continuing to hide the subtitle widget on the playback interface of the second video and display the subtitle hover window; and
  in response to the value of the first parameter being the second preset value, displaying the subtitle widget on the playback interface of the second video.

* * * * *